UNITED STATES PATENT OFFICE.

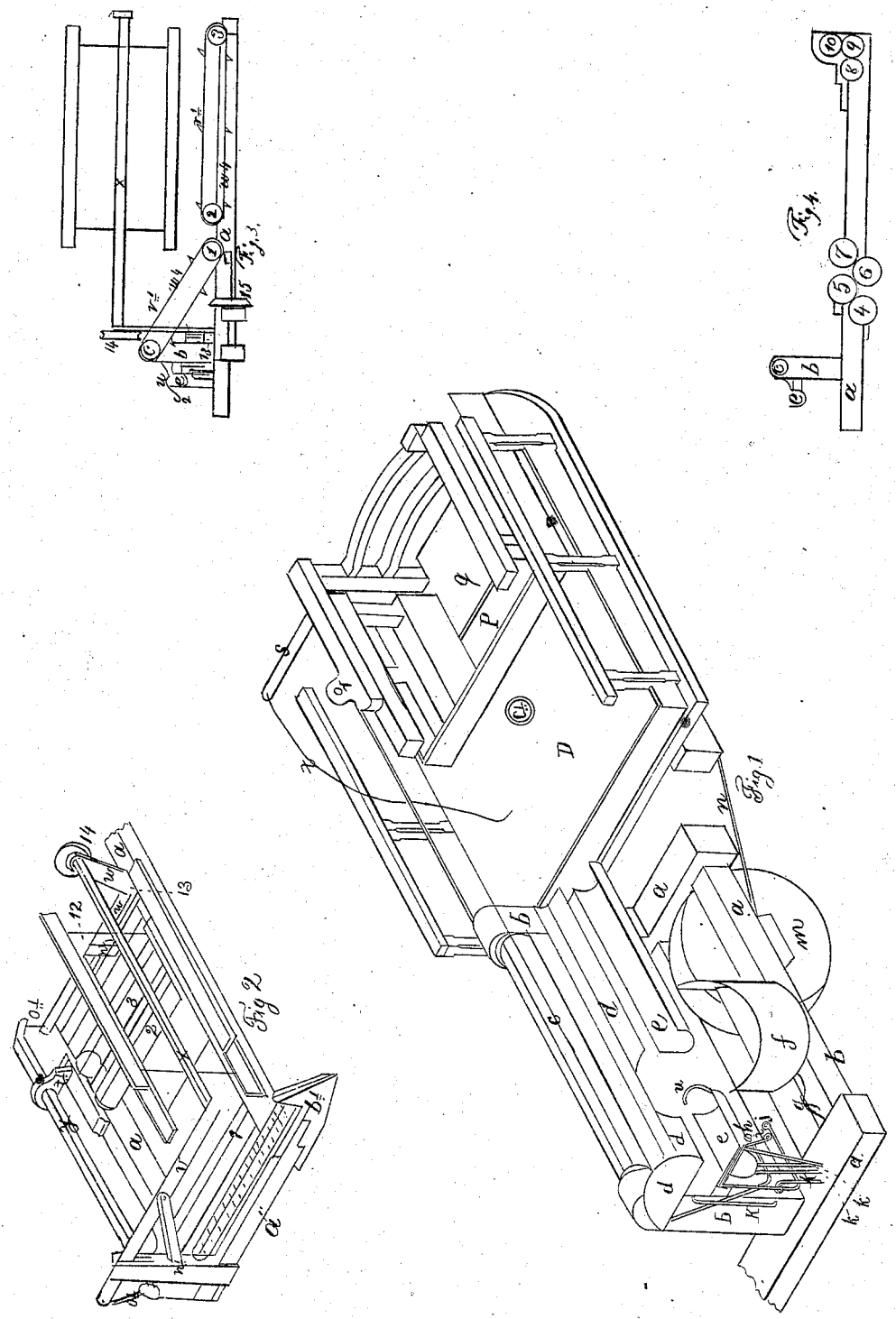

ANDREW RALSTON, OF WEST MIDDLETOWN, PENNSYLVANIA.

IMPROVEMENT IN HARVESTERS.

Specification forming part of Letters Patent No. 23,194, dated March 8, 1859.

*To all whom it may concern:*

Be it known that I, ANDREW RALSTON, of West Middletown, in Washington county, and State of Pennsylvania, have invented a new and useful Improvement in Harvesters; and I do hereby declare that the following is a full, clear, and exact description thereof, reference being had to the accompanying drawings, and to the letters of reference marked thereon, similar letters referring to similar parts.

The nature of my invention consists in attaching to harvesters an arrangement for raking, gathering, and binding grain in sheaves, and also an arrangement for depositing the sheaves in shocks.

To enable others skilled in the art to make and use my invention, I will proceed to describe its construction and operation.

In the accompanying drawings, Figure 1 is a perspective view of the binding and shocking arrangement. Fig. 2 is a perspective view of the part used for raking and gathering. Fig. 3 is a cut or sectional view of the raking, gathering, and binding arrangement. Fig. 4 is a side view of the back part of the frame.

$a$ is the frame of the harvester.

$b$ are two uprights on frame $a$. To these are attached a drum, $c$, a receiving-apron, $d$, and a sheaf-trough, $e$.

$f$ is a chair or seat for the binder, which is supported by two pedestals, $g$. These pedestals pass through the cross-piece of frame $a$ and rest on a spring, $l$. $h$, $i$, and $j$ are levers, and $k$ are guides for the levers $h$ and $j$.

$u$ is a compressing-hook.

$m$ is the wheel which supports the harvester, and from which the driving-power emanates.

$v$ and $w$ are two movable levers which support the raking-reel $x$. These levers have their bearings in two uprights, $n'$ and $n^2$, and are connected with shaft $y$ by two connecting-rods, $v'$. The shaft $y$ is supported by the two bearings $t'$, one of which is shown in Fig. 2.

$b'$ is a gathering-finger. $e'$ is a roller furnished with small brushes placed on the roller in a spiral or screw form, as represented by the dotted lines. This roller extends beyond the front of the harvester, and is connected to the gathering-finger $b'$, and is used for the purpose of gathering the fallen grain onto the horizontal apron $w'$.

1, 2 and 3 are drums used in connection with drum $c$ for operating the endless aprons $w'$. On these endless aprons are cross-strips $r'$.

12, 13, and 14 are pulleys used for driving the raking-reel $x$.

The two endless aprons are arranged as represented in Fig. 3, one being horizontal and the other inclined upward. These aprons and the raking-reel are operated by suitable gearing connected with the beveled wheel 15, Fig. 3. The wheels 4, 5, 6, 7, 8, 9 and 10 (represented by the plain circles in Fig. 4) are used for the purpose of imparting the desired motion to the drums 1, 2, and 3.

$o$ is the shocking-carriage, which is attached to the frame of the harvester by two rods, one of which is shown at $n$ in Fig. 1. This carriage moves on a caster, which is placed in or near the center of the carriage, under the point marked $c'$. This carriage is furnished with a shock-chamber which has a movable bottom, in two parts, $p$ and $q$. The part $p$ drops down, and the part $q$, being hinged at $r$, is moved out by drawing the cord $t$, which is attached to lever $s$. The raking-reel $x$ is raised or lowered by attaching to the lever $w$ the lever commonly used for raising and lowering the cutters.

The operation of my improvement is as follows: The harvester, with the shocking-carriage attached thereto, is drawn up to the work in the ordinary way, and as the grain is cut it is raked onto the horizontal endless apron by the raking-reel $x$, and is carried forward by this apron to the inclined apron, up which it is carried and deposited on the receiving-apron $d$, and when a sufficient quantity to form a sheaf is gathered on apron $d$, by raising lever $h$ the apron is turned down and the grain drops into the trough $e$. Then by pressing down the lever $j$ the compressing-hook $u$ will compress the sheaf. A band is then placed around it in the usual way. The sheaf is then thrown from trough $e$ onto the shocking-carriage $o$. A man on this carriage places the sheaves in the shock-chamber, and when the shock is completed it may be compressed by using cord $t$, attached to lever $s$, and then secured by a suitable band. The bottom $q$ is then drawn out by drawing on cord $t$. The drawing out of bottom $q$ causes bottom $p$ to drop, thereby depositing the shock on the ground. The bottoms are then readjusted and the same operation repeated.

Having thus described the nature, construction, and operation of my improvement, what I claim as of my invention, and desire to secure by Letters Patent of the United States, is—

1. The arrangement of the receiving-apron $d$, sheaf-trough $e$, compressing-hook $u$, and levers $h$, $i$, and $j$, when used in connection with the horizontal and inclined gathering-aprons $w'$, as herein described, and for the purpose set forth.

2. The use of the shocking-carriage $o$, furnished with a shock-chamber having a movable bottom, in two parts, $p$ and $q$, as herein described, and for the purpose set forth.

ANDREW RALSTON.

Witnesses:
JAS. B. JOHNSTON,
JAMES J. JOHNSTON.